United States Patent [19]

Minear et al.

[11] Patent Number: 4,869,349

[45] Date of Patent: Sep. 26, 1989

[54] FLEXCOMPRESSIONAL ACOUSTIC TRANSDUCER

[75] Inventors: John W. Minear; David C. Rathmann, both of Houston, Tex.

[73] Assignee: Halliburton Logging Services, Inc., Houston, Tex.

[21] Appl. No.: 266,717

[22] Filed: Nov. 3, 1988

[51] Int. Cl.[4] .............................................. G01V 1/40
[52] U.S. Cl. .................................. 181/102; 181/105; 367/35; 367/86; 367/174; 367/912
[58] Field of Search ............... 367/163, 168, 174, 912, 367/35, 86; 181/102, 105

[56] References Cited

U.S. PATENT DOCUMENTS

| | | | |
|---|---|---|---|
| 1,802,781 | 4/1931 | Sawyer et al. | 367/163 |
| 2,705,460 | 4/1955 | Burdick | 367/168 |
| 3,174,130 | 3/1965 | Woollett | 367/168 |
| 3,509,387 | 4/1970 | Thorn et al. | 310/324 |
| 3,983,425 | 9/1976 | Barlow | 367/163 |
| 4,319,345 | 3/1982 | Dennis | 367/25 |
| 4,409,681 | 10/1983 | White | 367/166 |
| 4,524,693 | 6/1985 | McMahon et al. | 367/167 |
| 4,636,999 | 1/1987 | Lygas | 367/156 |
| 4,682,308 | 7/1987 | Chung | 367/31 |
| 4,685,091 | 8/1987 | Chung et al. | 367/31 |
| 4,700,803 | 10/1987 | Mallett et al. | 181/106 |
| 4,706,230 | 11/1987 | Inoue et al. | 367/174 |

Primary Examiner—Deborah L. Kyle
Assistant Examiner—J. Woodrow Eldred
Attorney, Agent, or Firm—William J. Beard

[57] ABSTRACT

A flexcompressional acoustic transducer is set forth. In the preferred and illustrated embodiment, multiple parallel magnetostrictive rods provided with coils are coupled through a plate affixed to a radiating element. The radiating element in one embodiment is an elongate hollow cylinder which is closed at both ends. Vibrations from the magnetostrictive members cause the cylinder to radially flex, creating an omnidirectional acoustic wave transmitted radially outwardly, the apparatus being positioned in a sonde for connecting an acoustic wave front through the wall of the sonde for transmission into the surrounding wellbore fluids and the adjacent formations.

9 Claims, 1 Drawing Sheet

FLEXCOMPRESSIONAL ACOUSTIC TRANSDUCER

BACKGROUND OF THE DISCLOSURE

This disclosure is directed to an acoustic wave transducer for transmitting acoustic waves. In acoustic well logging procedures, formation properties are obtained by transmission of acoustic waves through formations adjacent to a well borehole. An important property derived from acoustic wave measurements includes the velocity of compression waves. Also, the velocity of shear waves is important. The velocity and attenuation of the Stoneley waves are also important. Compressional and shear waves generated by monopole transducers depend on critical refraction at the bore wall. If the velocity contrasts between the bore fluids and formation are not within specified limits, then neither refracted shear not compressional waves are generated. Specifically, if the shear velocity of the formation is less than the acoustic velocity of the bore fluid, no shear waves are generated. Hence, even though shear waves can propagate through the formation with a characteristic velocity this velocity cannot be measured with monopole transducers. However, multipole sources, e.g. dipole or quadrapole, cause the bore to vibrate in modes that depend on the shear wave velocity of the formation regardless of the relative magnitude of the formation and bore fluid velocities. By using such transducers as sources and receivers, the shear velocity of the formation can be measured.

In general, the lower the frequency content of the waves generated in a bore, the more useful they are for determining formation properties.

Generally, lower frequency waves are able to sample a larger volume of the formation surrounding the well borehole. Further, compressional and shear waves at lower frequencies are not significantly attenuated by casing so that cased wells can be logged in the same manner and with the same procedure as non-cased wells.

Stoneley waves with frequency less than about 5 kilohertz are more affected by formation permeability than are those of higher frequency. Recalling as noted above that certain frequencies are more desirable, many prior art transducers form signals where the signal is dependent on the diameter of the transducer in the sonde. In particular, transducer which have piezoelectric ceramic rings and those having magnetostrictive scrolls have resonant frequencies that depend on transducer diameter. Generally, it is difficult to build well logging transducers of these types with resonant frequencies which are much below 12000 hertz or 12 kilohertz. In light of the size limitations, tool diameter has heretobefore served to limit the resonant frequency. Indeed, a tool diameter which is reduced inevitably establishes higher frequency operating range which is not as useful.

This disclosure, however, sets forth a transducer which can generate single and multipole radiation patterns at low frequencies which are independent of tool diameter. Hence, the apparatus can form low frequency compression or shear refracted waves. Also, low frequency Stoneley waves are formed. Low frequency flexural and screw modes can also be excited by the transducer. Indeed, the description will set forth a transducer which successfully operates at a selected low frequency having a completely independent relationship to the diameter of the tool and the mounting system which supports the transducer.

From the foregoing, certain advantages of the present apparatus will become more readily apparent coupled with the description as set forth below. One especially important feature is the ability to shape the radiation pattern as it is emitted from the transducer. A symmetrically emitted wave form can be generated which radiates outwardly in all directions. By contrast, a dipole can be operated in accordance with the present disclosure which has preferred radiation directions. In both instances, the output frequency is independent of tool diameter so that a particular frequency can be achieved.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings:

FIG. 1 shows an acoustic logging sonde suspended in a well borehole which incorporates acoustic sensors for transmitting an acoustic wave through the formations adjacent the well borehole;

FIG. 2 is a sectional view through a monopole compressional acoustic transducer in accordance with the present disclosure; and FIG. 3 is a sectional view through an alternate embodiment acoustic transducer showing a dipole configuration.

DETAILED DESCRIPTION OF THE PREFERRED EMBODIMENT

Figure 1:
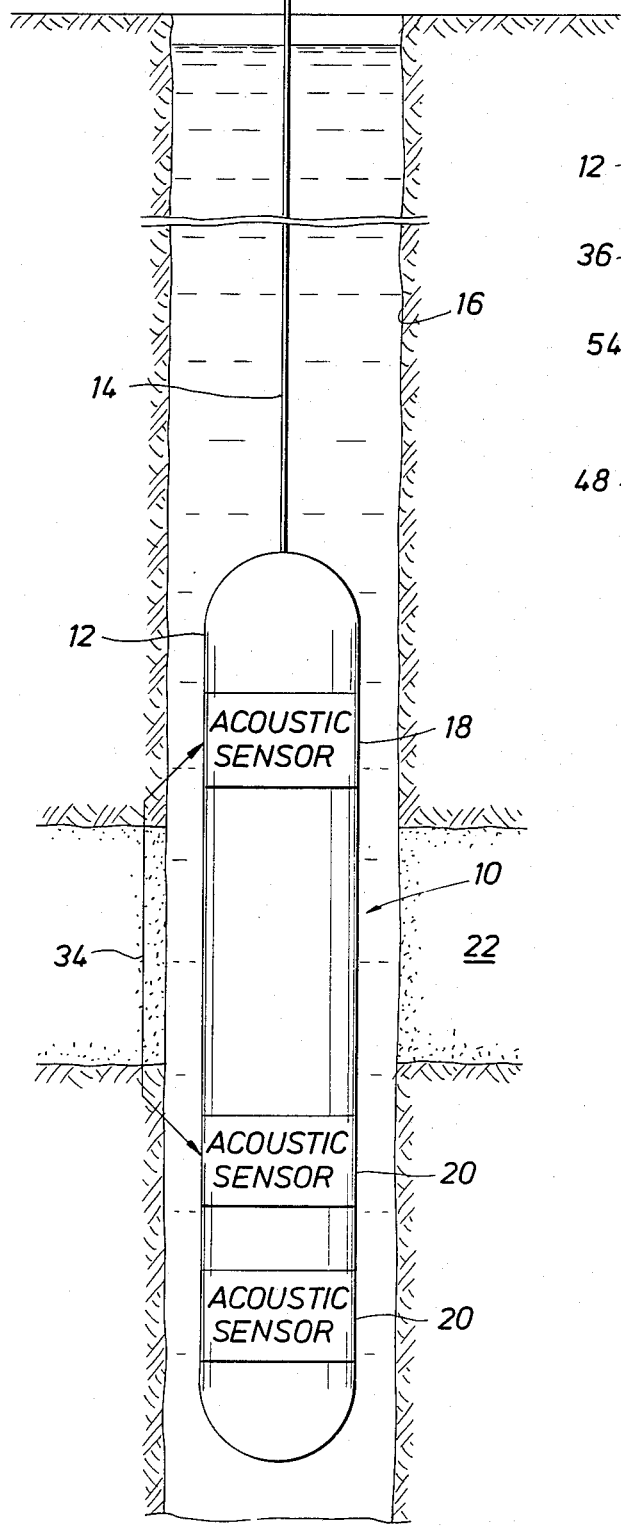

Referring first to FIG. 1 of the drawings, the numeral 10 identifies a logging tool which incorporates an acoustic logging system. The logging tool 10 is incorporated in a sonde 12 suspended on an armored cable 14 in a well borehole 16. The well is typically uncased, but the acoustic logging system described herein is capable of operation in a cased well also. The sonde supports an upper acoustic sensor 18 and an array of lower acoustic sensors 20. More will be noted regarding these two devices hereinafter. The device is used to measure characteristics of acoustic wave propagation through a formation of interest, an exemplary formation being indicated at 22. Formation characteristics of interest include velocity and attenuation of acoustic waves including compressional, shear and Stoneley waves. The logging cable 14 extends over a sheave 24 and is stored on a large drum 26. The logging cable encloses appropriate electrical conductors which are connected to a computer 28. It converts the signals into suitable indications of formation characteristics responsive to wave fronts traveling through the formation and that data is supplied to a recorder 30. Moreover, the data which is obtained is recorded as a function of depth by a mechanical or electrical depth measuring apparatus 32 which is connected to the sheave and which provides a depth indication to the recorder 30.

The sensors 18 and 20 can either be acoustic transmitters or receivers. The present disclosure is directed to an acoustic transmitter, namely a device which forms an acoustic wave which travels from the transmitter to the receiver(s) as exemplified in FIG. 1 of the drawings. It should be noted that the well 16 is usually filled with drilling fluid to a depth which submerges the sonde 12 so that the acoustic waves travel along a pathway exemplified by the representative path 34 shown in FIG. 1. The generated acoustic signal can travel upwardly or downwardly as required. To this end, the acoustic transmitter can be either at the top or bottom portion of the sonde. Going now to FIG. 2 of the drawings, the sonde 12 is shown in sectional view and incorporates a section which is perforated with a number of holes 36. They are included to assure that the acoustic signal generating device of the present disclosure is connected with or coupled to the fluid so that the acoustic signal is properly coupled into the fluid and then into the adjacent formation. The sonde thus includes the transverse support frame member 38 which extends across the sonde to support the acoustic signal generating apparatus. The numeral 40 identifies the signal generator in accordance with the teachings of this disclosure. The signal generator 40 is a unitized structure installed in or integral with the sonde which operates particularly without regard to the diameter of the sonde. The acoustic signal generating means 40 is constructed with an open framework having a bottom plate 42 and a parallel and relatively similar top plate 44. The two plates are preferably circular and are joined together by three or four upstanding frame members 46. This defines an open lattice work which supports the structure in question.

An elongate cylindrical, hollow sleeve 48 serves as a resonating cavity. A central strut 50 positioned on the interior is also included. The strut 50 in conjunction with the cylinder 48 has a structural stiffness which will be discussed in detail. Both connect to a cover plate 52, the plate 52 defining a cavity within the cylinder 48. The plate 52 is constructed with a central magnetic pole piece 54 which is positioned opposite a pole piece 56. They are part of a magnetic circuit to be described. The pole pieces 54 and 56 are spaced from one another by a plurality of magnetostrictive rods 50 which are wound with current conducting coils 64. A power supply 66 is connected to the coils to provide a controlled duration pulse or continuous signal so that the magnetostrictive rods 60 are timely pulsed, thereby creating vibrations in the system having a frequency to be described. The impulse applied to the system initiates an acoustic or sonic wave having the frequency and shape discussed below.

Figure 2:
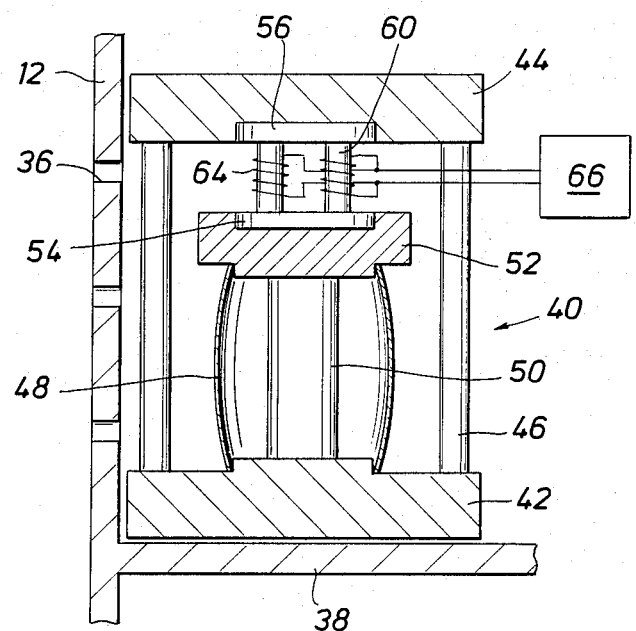

Briefly, the signal generator 40 in FIG. 2 is symmetric around a centerline axis through the equipment. The cylindrical wall 48 serves as the radiating surface for the pulse. The equation below is the approximate frequency of the system shown in FIG. 1.

EQUATION 1

$$f = k_1(2k_2\pi)^{-1}(1+m/M)(1+k_1/k_2)^{-1}$$

The stiffness of the magnetostrictive rods 60 is represented by $k_1$ while the stiffness of the cylinder 48 and central strut 50 is given by $k_2$. The ratio of $k_1/k_2$ can be adjusted to the range of about 100 to 1,000 or greater. The mass ratio in the foregoing equation is approximated by the ratio of the mass of the rods 60 and the plate 52 to the mass of the end plate 44. It is not uncommon for this to be something in the range of 0.03 to perhaps 0.10. The frequency is made a function of the stiffness and mass factors noted above, and is completely independent of diameter. Diameter is intuitively ordinarily a key frequency factor. This approach however, avoids resonant frequency dependence on diameter.

Assume for purposes of description that there are four magnetostrictive rods 60. Assume also that the cylinder 48 has a diameter of three inches so that it will fit readily in the sonde. Assume further that the perforations 36 completely surround the sonde so that the acoustic wave front can radiate in all directions. In this example, application of an appropriate signal to the magnetostrictive rods 60 forms a pressure wave radiating outwardly in all directions of azimuth from the acoustic generator 40. Going now to the refracted propagation path 34, the acoustic wave will travel through the fluid which fills the well 16, and thereafter be refracted into the formations which surround the well. The acoustic wave front will travel to the opposite end of the sonde where the signal is detected. The idealized signal propagation path 34 thus represents transfer of the pulse where it is refracted at the change of media on transmitting from the surrounding fluid into the adjacent formations, this being accomplished by refraction at the liquid-solid interface.

Figure 3:
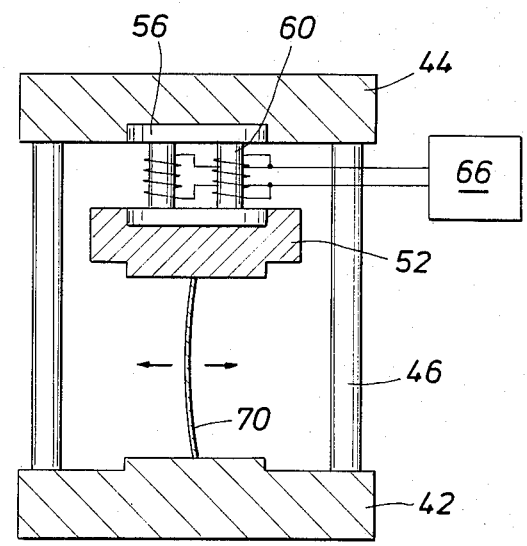

Attention is now directed to FIG. 3 of the drawings which illustrates an alternate embodiment. This embodiment includes a rectangular plate 70 which is centered in the apparatus which is otherwise identified by the same reference numerals as used in FIG. 2. Briefly, the strut 70 is formed with a rectangular cross-section and is shown with the thin dimension on edge in FIG. 3. This enables the strut to vibrate to the left and right as viewed in FIG. 3, and it therefore functions as a dipole source. This causes the propagated acoustic or sonic wave to have a directional preference. It thus transmits in opposite directions with 180° phase shift between the two preferential directions. The dipole transmits substantially no signal at 90° to the strong preferential directions of propagation. By contrast, the monopole system shown in FIG. 2 is able to transmit in all directions of azimuth. The same relationship tabulated above yields the approximation of the frequency from the dipole system shown in FIG. 3.

The present apparatus 40 can be installed at the upper or lower ends of the sonde. Indeed, it can be installed at both locations so that transmitted pulses can be formed at both locations. Without regard to the specific location in the sonde, the pulse generating apparatus is installed in the sonde without regard to the size or diameter of the sonde. This enables formation of a sonic pulse having a frequency which is independent of sonde diameter. Further, the sonde utilizes appropriate receivers to pick up the transmitted acoustic pulses which are then processed in the known fashion for outputting through the apparatus shown in FIG. 1. One variation is the use of two dipole transducers arranged at 90° to each other. This arrangement produces flexure vibration modes at right angles. Shear velocity measurements in each of the directions provides information about formation velocity anisotropy.

While the foregoing is directed to the preferred embodiment, the scope thereof is determined by the claims which follow.

What is claimed is:

1. An apparatus for forming a sonic wave radiated from a sonde in a well borehole, the wave forming apparatus comprising:
   (a) an acoustic energy radiating elongate cylindrical member having two ends and a requisite stiffness and mass said member being positioned in a sonde;
   (b) vibration forming means provided with electrical power for vibrating wherein vibrations are coupled to said energy radiating member;
   (c) means connected to one end of said cylinder for coupling said vibration forming means to said radiating member to impart radiation thereto;
   (d) mounting means for holding said radiating member and said vibration forming means in a fixed structural relationship wherein said mounting means further includes a specified mass; and
   (e) said vibration forming means coupling vibrations to said radiating member dependent on the relative mass and stiffness thereof to initiate formation of a sonic wave radially expanding outwardly to transmit a wave therefrom in all directions coupled through fluid in a well borehole.

2. The apparatus of claim 1 including top and bottom circular covers for said cylinder wherein one of said covers is structurally connected with said vibration forming means.

3. The apparatus of claim 1 wherein said vibration forming means comprises multiple parallel magnetostrictive rods which are magnetically coupled with coil means for electrical excitation.

4. The apparatus of claim 1 wherein said radiating member comprises an elongate cylinder enclosing an elongate centered within said cylinder and strut having a specified stiffness.

5. The apparatus of claim 4 wherein said cylinder and strut have a requisite stiffness and mass and said vibration forming means has a requisite stiffness and mass so that the frequency of vibrations is determined by the stiffness ratio and mass ratios of said cylinder and strut.

6. The apparatus of claim 5 wherein the vibration frequency is an omnidirectional compression wave.

7. The apparatus of claim 6 wherein the vibrations are formed on applying a signal to said vibration forming means.

8. An apparatus for forming a sonic wave radiating from a sonde in a well borehole, the wave forming apparatus comprising:
   (a) an acoustic energy radiating member having the form of an elongate bar wherein the bar has two ends and is arranged parallel to the axis of a sonde and is positioned therein;
   (b) vibration forming means provided with electrical power for vibrating wherein vibrations are coupled to said energy radiating member;
   (c) means connected to one end of said bar for coupling said vibration forming means to said radiating member to impart vibration to said bar;
   (d) mounting means for holding said bar and said vibration forming means in a fixed structural relationship within said sonde wherein said mounting means further includes a specified mass; and
   (e) said vibration forming means coupling vibrations to said radiating member dependent on the relative mass and stiffness thereof to initiate dependent on the relative mass through fluid in a well borehole.

9. The apparatus of claim 8 wherein said coupling means incorporates a structural end member connected with said vibration forming means, and said end member is additionally coupled directly and fixedly to said bar, and further including a second and similar end member connected to said bar at the opposite end thereof wherein said two end located members are fixed within the sonde.

* * * * *